United States Patent
Nishida et al.

(10) Patent No.: US 8,040,377 B2
(45) Date of Patent: Oct. 18, 2011

(54) DISPLAY APPARATUS, WIRELESS TRANSMITTING AND RECEIVING SYSTEM, DISPLAY METHOD, DISPLAY CONTROL PROGRAM, AND RECORDING MEDIUM

(75) Inventors: Shinichi Nishida, Yaita (JP); Yuhsuke Iwamoto, Yaita (JP)

(73) Assignee: Sharp Kabushiki Kaisha, Osaka (JP)

( * ) Notice: Subject to any disclaimer, the term of this patent is extended or adjusted under 35 U.S.C. 154(b) by 1225 days.

(21) Appl. No.: 10/589,018

(22) PCT Filed: Feb. 10, 2005

(86) PCT No.: PCT/JP2005/002057
§ 371 (c)(1),
(2), (4) Date: Aug. 10, 2006

(87) PCT Pub. No.: WO2005/078944
PCT Pub. Date: Aug. 25, 2005

(65) Prior Publication Data
US 2007/0167131 A1    Jul. 19, 2007

(30) Foreign Application Priority Data
Feb. 13, 2004  (JP) .................................. 2004-037182

(51) Int. Cl.
*H04N 17/00*  (2006.01)
*H04N 17/02*  (2006.01)

(52) U.S. Cl. ......... 348/180; 348/569; 348/552; 348/558

(58) Field of Classification Search ................... 348/180, 348/184–185, 192–193, 553, 563, 569, 570, 348/731, 181, 461, 465, 468, 558, 725, 552; 725/72, 70, 140, 152, 107; 455/3.2, 6.2–6.3, 455/226.1, 226.2, 226.4; H04N 17/00, 17/02
See application file for complete search history.

(56) References Cited

U.S. PATENT DOCUMENTS

| | | | |
|---|---|---|---|
| 6,366,792 B1 | 4/2002 | Katsuki | |
| 6,493,545 B1 | 12/2002 | Sugaya | |
| 6,580,452 B1 * | 6/2003 | Gangitano | 348/180 |
| 6,704,557 B1 * | 3/2004 | Krishnamurthy et al. | 455/278.1 |
| 6,944,422 B2 * | 9/2005 | Fitrandolph | 455/1 |
| 7,019,791 B2 * | 3/2006 | Yoshizawa et al. | 348/738 |
| 7,275,254 B1 * | 9/2007 | Jutzi | 725/72 |
| 2002/0018057 A1 | 2/2002 | Sano | |
| 2002/0021685 A1 | 2/2002 | Sakusabe | |
| 2002/0071401 A1 | 6/2002 | Nire | |
| 2002/0181417 A1 | 12/2002 | Malhotra et al. | |
| 2003/0120742 A1 | 6/2003 | Ohgami et al. | |

FOREIGN PATENT DOCUMENTS

| | | |
|---|---|---|
| GB | 1 393 556 | 5/1975 |
| GB | 2 343 334 A | 5/2000 |
| GB | 2 352 589 A | 1/2001 |
| JP | 04-352519 A | 12/1992 |

(Continued)

*Primary Examiner* — Trang U Tran
(74) *Attorney, Agent, or Firm* — Birch, Stewart, Kolasch & Birch, LLP (57) ABSTRACT

In cases where a video signal cannot be normally received, a display apparatus allows a display by which one can recognize whether or not a jamming electric wave in an operation frequency band used for wireless communication makes it impossible to normally receive a video signal. More specifically, the display apparatus is a display apparatus for receiving at least a video signal by wireless communication, the display apparatus, including a wireless receiving unit for receiving the video signal that is wirelessly transmitted; a jamming signal detecting unit for detecting, in an operating frequency band used for the wireless communication, a jamming signal other than the video signal; and a jamming signal information outputting unit for, in response to the detection of the jamming signal, outputting jamming signal information indicating presence of the jamming signal.

22 Claims, 7 Drawing Sheets

FOREIGN PATENT DOCUMENTS

| | | |
|---|---|---|
| JP | 2000-101495 A | 4/2000 |
| JP | 2000-151642 A | 5/2000 |
| JP | 2000-182084 A | 6/2000 |
| JP | 2001-189947 A | 7/2001 |
| JP | 2002-135745 A | 5/2002 |
| JP | 2002-304412 A | 10/2002 |
| JP | 2002-320165 A | 10/2002 |
| JP | 2002-344843 A | 11/2002 |
| JP | 2003-304412 A | 10/2003 |
| KR | 2000-0002387 A | 1/2000 |
| KR | 2002-0017619 A | 3/2002 |
| WO | WO-02/23819 A2 | 3/2002 |

\* cited by examiner

| | | |
|---|---|---|
| 1. | 000 | |
| 2. | 000 | |
| 3. | 000 | |
| 4. | 000 | |
| 5. | 000 | |
| 6. | 000 | |
| 7. | 000 | |
| 8. | 000 | |
| 9. | 000 | |
| 10. | 500 | |
| 11. | 850 | |
| 12. | 300 | |
| 13. | 000 | |
| 14. | 000 | |

DISPLAY APPARATUS, WIRELESS TRANSMITTING AND RECEIVING SYSTEM, DISPLAY METHOD, DISPLAY CONTROL PROGRAM, AND RECORDING MEDIUM

TECHNICAL FIELD

The present invention relates to a display apparatus, a wireless transmitting and receiving system, a display method, a display control program, and a recording medium, in which or by which a video signal is transmitted and received by using wireless communications such as a wireless LAN.

BACKGROUND ART

Recently, a display apparatus and a transmitting and receiving system have been developed each of which receives a wirelessly transmitted video signal and which displays an image that is based on the video signal. However, in cases where a radio wave is not normally received, an image may deteriorate in quality or may not be displayed at all. Such an image causes a viewer to feel uncomfortable. In light of this, a display apparatus is known which does not display an image whose quality is significantly deteriorated but which displays an image containing information indicating that the image is not receivable (Patent Document 1: Japanese Unexamined Patent Publication No. 352519/1992 (Tokukaihei 4-352519).

However, the display apparatus described in Patent Document 1 is arranged as follows. That is, the display apparatus compares a signal level of a received video signal with a predetermined level. When the signal level is less than the predetermined level, the display apparatus does not display the image that is based on the received video signal, but displays the image containing the information indicating that the image is not receivable. Incidentally, there are various reasons why the video signal cannot be normally received. The video signal cannot be normally received, for example, when a jamming radio wave or a different wireless communication device is present, or when the display apparatus is out of a communication range. In any case, the display apparatus of Patent Document 1 invariably displays the image containing the information indicating that the image is not receivable. This allows the viewer to know that the image is not receivable. However, the viewer does not know a reason why the image is not receivable. This made it impossible for a viewer to consider and find a way of dealing with a case where the image is not receivable. the term "jamming" does not refer to intentional interference with respect to a certain device, but refers to radio interference with another device using the same frequency.

DISCLOSURE OF INVENTION

The present invention has been made in view of the foregoing problems, and it is an object of the present invention to provide a display apparatus, a wireless transmitting and receiving system, a display method, a display control program, and a recording medium, each of which allows a display by which one can recognize whether or not a jamming electric wave in an operation frequency band used for wireless communication makes it impossible to normally receive a video signal.

That is, the display apparatus of the present invention is a display apparatus for receiving at least a video signal by wireless communication, the display apparatus, including: wireless receiving means for receiving the video signal that is wirelessly transmitted; jamming signal detecting means for detecting, in an operating frequency band used for the wireless communication, a jamming signal other than the video signal; and jamming signal information outputting means for, in response to the detection of the jamming signal, outputting jamming signal information indicating presence of the jamming signal.

According to the above structure, it is possible to recognize whether or not the jamming electric wave in the operation frequency band used for the wireless communication makes it impossible to receive the video signal normally. With this, a reason why the signal cannot be received can be recognized with ease.

BEST MODE FOR CARRYING OUT THE INVENTION

The following explains an embodiment of the present invention. Note that the present invention is not limited to the embodiment.

Figure 2:
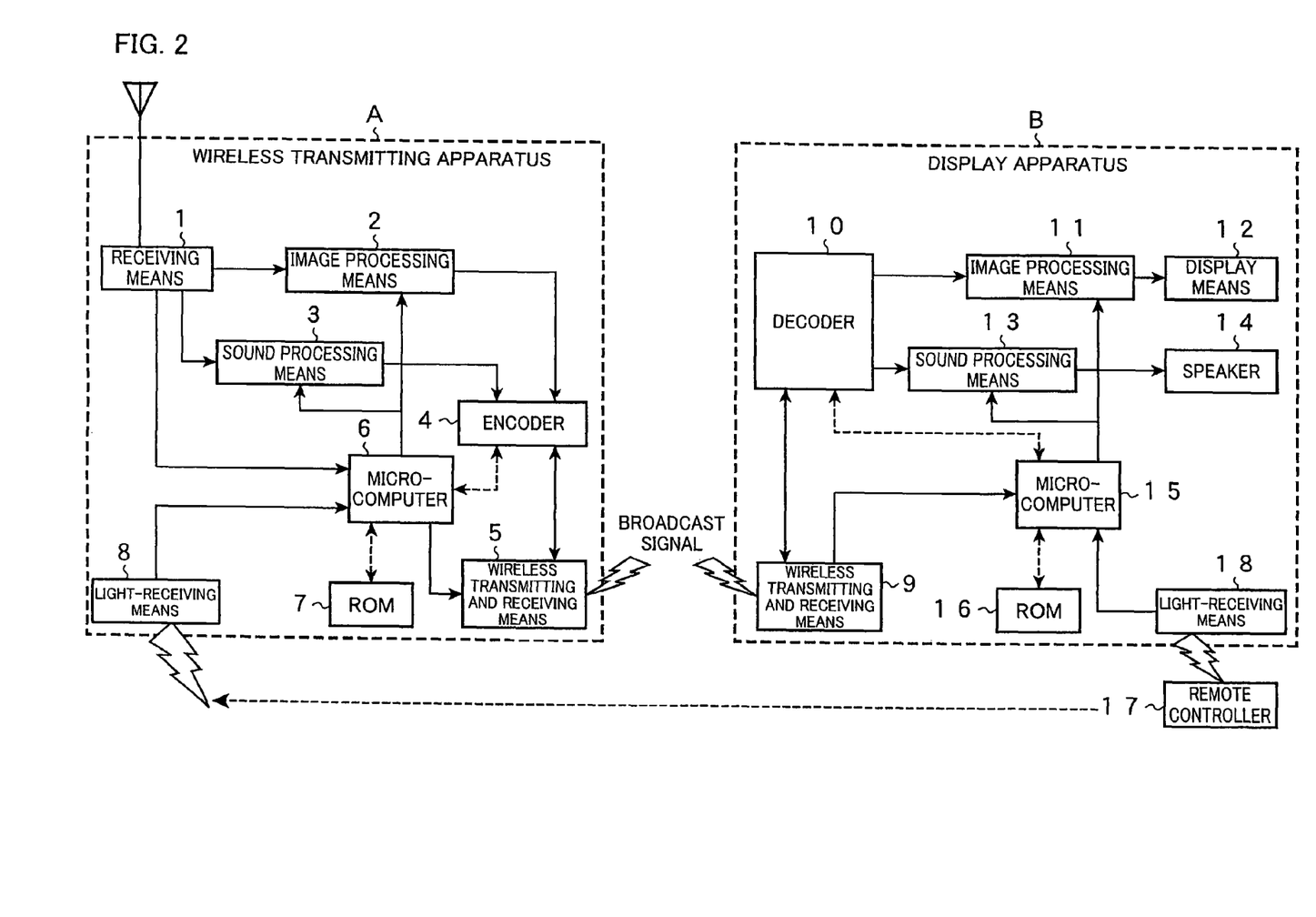
FIG. 2 is a block diagram showing a wireless transmitting and receiving system according to the embodiment of the present invention.

FIG. 2 is a block diagram showing a wireless transmitting and receiving system according to the embodiment of the present invention. That is, as shown in FIG. 2, the wireless transmitting and receiving system includes a wireless transmitting apparatus A and a display apparatus B.

The wireless transmitting apparatus A includes: receiving means 1, which receives a broadcast signal; image processing means 2, which processes a video signal contained in the broadcast signal received by the receiving means 1; sound processing means 3, which processes an audio signal contained in the broadcast signal received by the receiving means 1; an encoder 4, which compresses the audio and video signals respectively processed by the image processing means 2 and the sound processing means 3; wireless transmitting and receiving means 5, which superimposes, onto a signal having a predetermined carrier frequency, the video and audio signals compressed by the encoder 4, and which transmits the signal thus superimposed to the display apparatus B; a microcomputer 6 for carrying out these processes appropriately; and a ROM 7 for storing various set values and the like. The wireless transmitting apparatus A may further include light-receiving means 8 for receiving a predetermined signal from a remote controller (remote-control apparatus) 17. The light-receiving means 8 serves as means for changing, via the microcomputer 6, the set values stored in the ROM 7. Note that the receiving means 1 can receive not only a broadcast signal but also a video signal externally supplied or the like (not shown).

The display apparatus B includes: wireless transmitting and receiving means 9, which receives a signal transmitted from the wireless transmitting and receiving means 5 of the wireless transmitting apparatus A; a decoder 10, which decodes the signals contained in the superimposed signal received by the wireless transmitting and receiving means 9; image processing means 11, which processes the video signal decoded by the decoder 10; display means 12, which displays an image processed by the image processing means 11; sound processing means 13, which processes the audio signal decoded by the decoder 10; a speaker 14, which outputs a sound processed by the sound processing means 13; a microcomputer 15 for carrying out these processes appropriately; and a ROM 16 for storing various set values and the like. The display apparatus B further includes light-receiving means 18 for receiving a predetermined signal from the remote controller 17. The light-receiving means 18 serves as means for changing, via the microcomputer 15, the set values stored in the ROM 16. With this, various control operations can be carried out.

According to the above arrangement, the wireless transmitting apparatus A is provided with the light-receiving means 8. Alternatively, the following arrangement may be possible. Specifically, in the arrangement, the signal transmitted from the remote controller 17 is wirelessly transmitted from the wireless transmitting and receiving means 9 to the wireless transmitting apparatus A, via the light-receiving means 18 and microcomputer 15 of the display apparatus B, so as to be transmitted to the microcomputer 6. This arrangement can make it unnecessary for the wireless transmitting apparatus A to be provided with the light-receiving means 8.

In the present invention, the wireless communication can adopt a communication method defined, for example, by the IEEE 802.11b, which is an international wireless LAN standard. The IEEE 802.11b uses a 2.4 GHz frequency band (ranging approximately from 2.4 GHz to 2.5 GHz), and it is possible to use a recognition information signal for enabling connection to a specific destination. Such a recognition information signal is called an SSID. According to the SSID, the same recognition information signal is set between a transmitting section and a receiving section. This allows the receiving section to receive a signal from the transmitting section which transmits the recognition information signal thus set.

Note that: in the present invention, not only the IEEE 802.11b but also other wireless communication methods can be adopted.

Examples of such other wireless communication method include the IEEE 802.11g (up to 50 Mbps), which uses the same 2.4 GHz band as the IEEE 802.11b (up to 11 Mbps) and which allows faster communication than does the IEEE 802.11b. Examples of a wireless communication method using another frequency band include the IEEE 802.11a, which uses a 5.2 GHz band as a communication frequency band. Examples of a further wireless communication methods includes: the HiSWAN, which uses the 5.2 GHz band; and the Bluetooth, in commercial products such as a PC, which uses a 2.45 GHz band, and a communication speed of 1 Mbps to 2 Mbps. The present invention can be applied to each of these communication standards. In this case, it is possible to achieve the same effects when a jamming radio wave transmitted from a different electronic device using the same communication band is detected.

In the display apparatus B, for example, the microcomputer 15 detects a level, disorder, or the like of the received video signal, and determines whether or not the display apparatus B is in a poor signal reception state in which normal reception is not carried out. Furthermore, the microcomputer 15 detects a received recognition information signal, and determines whether or not the detected recognition information signal is identical to a recognition information signal set in the ROM 16 or the like. Therefore, in cases where the microcomputer 15 determines that the detected recognition information signal is different from the set recognition information signal, it is possible to recognize that a jamming radio wave is generated due to the presence of a different communication device transmitting the different recognition information signal. Further, the microcomputer 15 detects whether or not a jamming signal other than the received video signal exists in an operating frequency band used for the wireless communication. For example, in the 2.4 GHz band, the display apparatus B is likely to receive such a jamming electric wave from a device such as a microwave oven.

Figure 1:
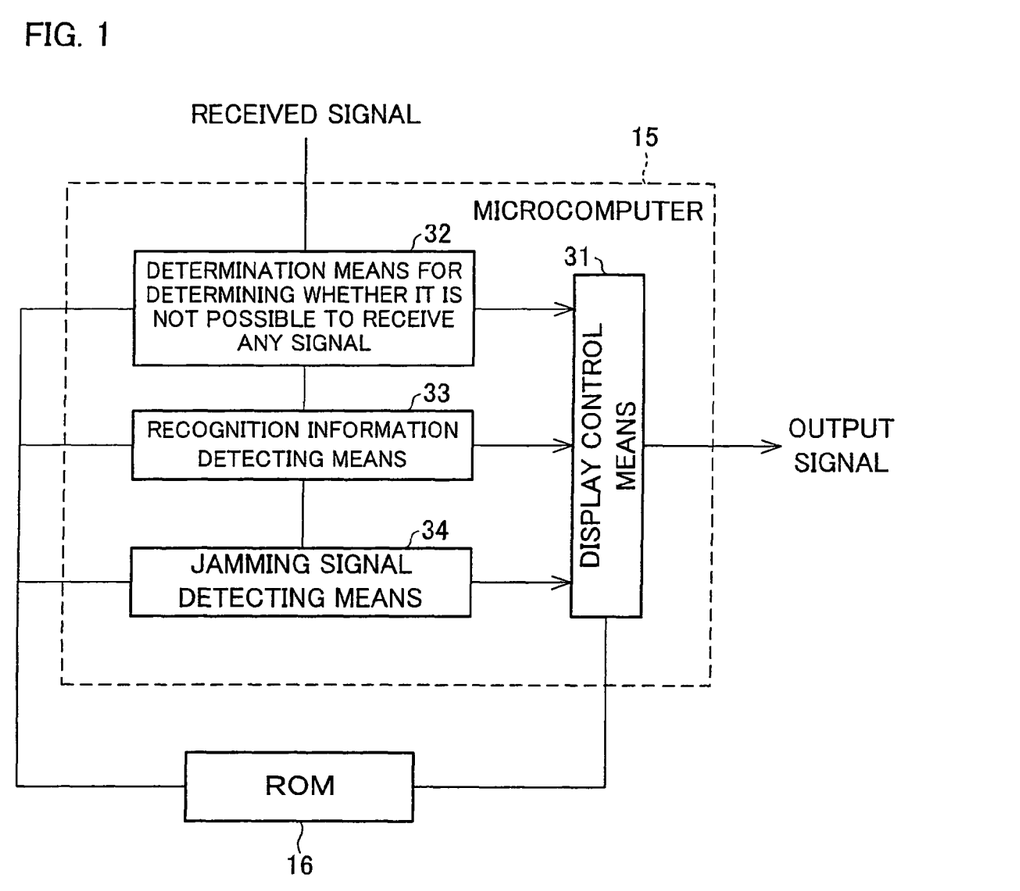
FIG. 1 is a block diagram schematically showing a microcomputer provided in a display apparatus according to an embodiment of the present invention.

That is, as shown in FIG. 1, the microcomputer 15 includes display control means 31 for generating an output signal for carrying out display control with respect to the image processing means 11. The display control means 31 outputs various display control signals in accordance with signals transmitted from (i) determination means 32 for determining whether it is not possible to receive any signal, (ii) recognition information detecting means 33, and (iii) jamming signal detecting means 34, which means 32, 33, and 34 are provided in the microcomputer 15.

The determination means 32 detects the level, disorder, or the like of the received video signal, and determines whether or not the display apparatus B is in the poor signal reception state in which normal reception is not carried out. The determination is carried out using a threshold value of the signal level prestored in the ROM 16, for example. That is, the determination means 32 determines whether or not a received signal has a signal level greater than the threshold value of the signal level stored in the ROM 16. In cases where the signal level of the received video signal is not greater than the signal level threshold value, the determination means 32 determines that it is not possible to receive any signal. Then, the determination means 32 sends, to the display control means 31, a signal indicating that it is not possible to receive any signal.

Further, the recognition information detecting means 33 detects the recognition information signal from the received signal, and determines whether or not the recognition information signal is identical to the recognition information signal set in the ROM 16 or the like. Then, in cases where the detected recognition information signal is different from the set recognition information signal, the recognition information detecting means 33 sends, to the display control means 31, a signal indicating that other communication device, which transmits a different recognition information signal, is present near here.

Furthermore, the jamming signal detecting means 34 detects whether or not a signal other than the received video signal exists in the operating frequency band used for the wireless communication. Note that: the signal other than the received video signal refers to a signal from which no recognition information signal is detected, and will be hereinafter referred to as "jamming signal". For example, in the 2.4 GHz band, the display apparatus B is likely to receive such a jamming electric wave, i.e., a jamming signal from a device such as a microwave oven. Moreover, in cases where the jamming signal detecting means 34 has detected the jamming signal, the jamming signal detecting means 34 sends, to the display control means 31, a signal indicating that the jamming signal detecting means 34 has detected the jamming signal.

Thus, the display control means 31 prepares a display screen image in accordance with each of the signals respectively transmitted from the determination means 32, the recognition information detecting means 33, and the jamming signal detecting means 34. The display screen image will be specifically described later.

The display control, carried out when it is not possible to receive any signal, of the present invention will be described with reference to (i) a block diagram shown in FIG. 1, (ii) a block diagram shown in FIG. 2, and (iii) a flow chart shown in FIG. 3.

First, in cases where a video signal transmitted from the wireless transmitting apparatus A cannot be normally received by the display apparatus B (S1), the display apparatus B stops displaying that is based on the received video signal (S2). On this occasion, the determination means 32 shown in FIG. 1 determines whether it is not possible to receive any signal. In accordance with the determination, the display control means 31 sends, to the image processing means 11, a control signal for stopping the display.

Next, the microcomputer 15 detects whether other recognition information signal than the set recognition information signal exists (S3). On this occasion, the recognition information detecting means 33 shown in FIG. 1 detects whether other recognition information signal exists, under the state in which it is not possible to receive any signal.

In cases where the other recognition information signal is detected in S3, it is determined that any signal cannot be received due to the jamming electric wave transmitted from the communication device transmitting the other recognition information signal. Then, the display apparatus B displays so as to inform that "other SS wireless transmitter exists" (S4). Here, when the recognition information detecting means 33 has detected the other recognition information signal, the recognition information detecting means 33 sends, to the display control means 31, a signal indicating that the recognition information detecting means 33 has detected the other recognition information signal. Then, the display control means 31 sends, to the image processing means 11, a signal for displaying "other SS wireless transmitter exists".

On the other hand, in cases where any other recognition information signal is not detected in S3, the microcomputer 15 detects whether or not a jamming signal other than the received video signal exists in the operating frequency band used for the wireless communication (S5). In this case, the jamming signal detecting means 34 checks for presence/absence of the jamming signal.

Figure 4:
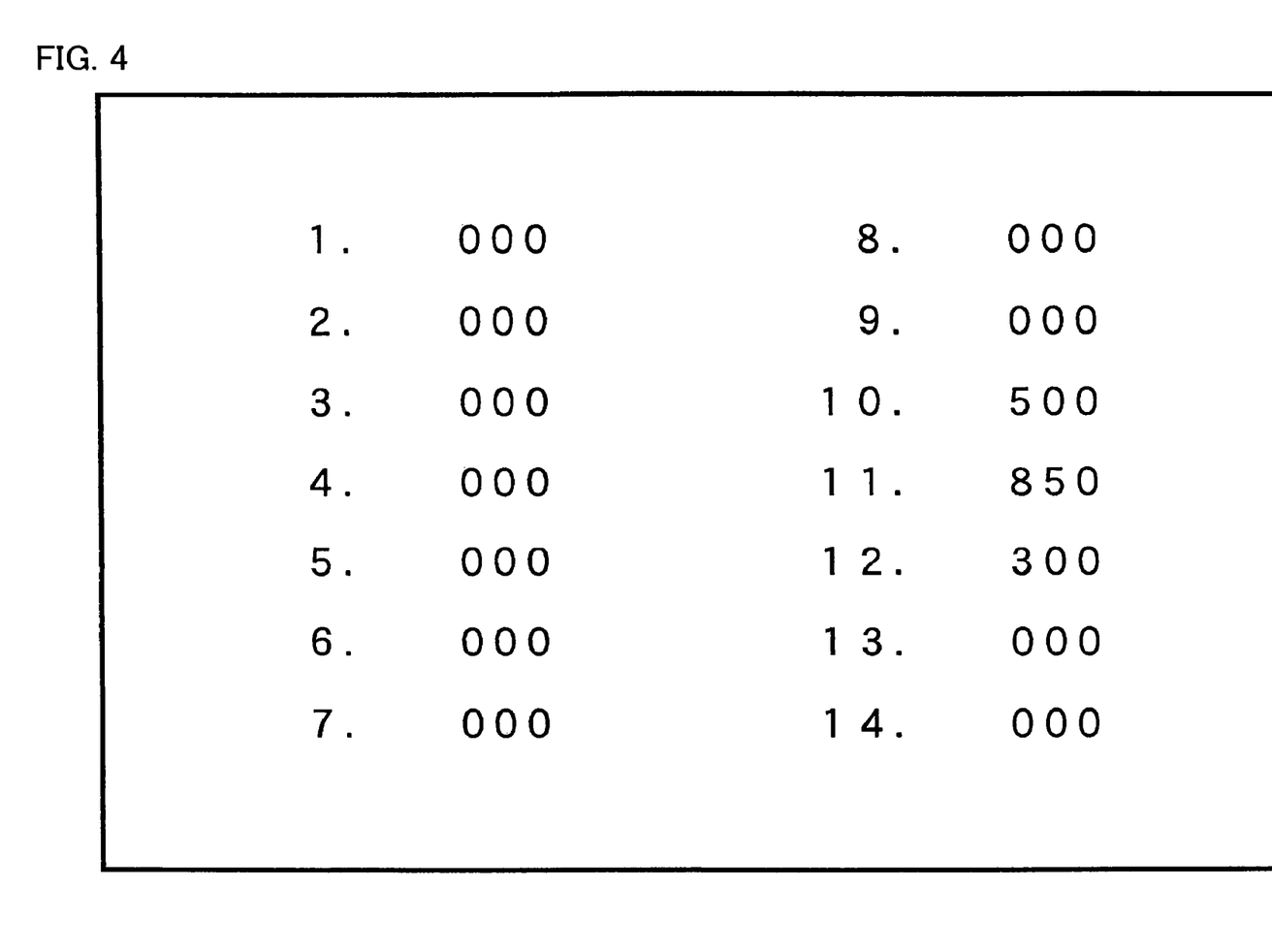
FIG. 4 is a diagram showing a manner of jamming signal information displayed on a screen.
Figure 5:
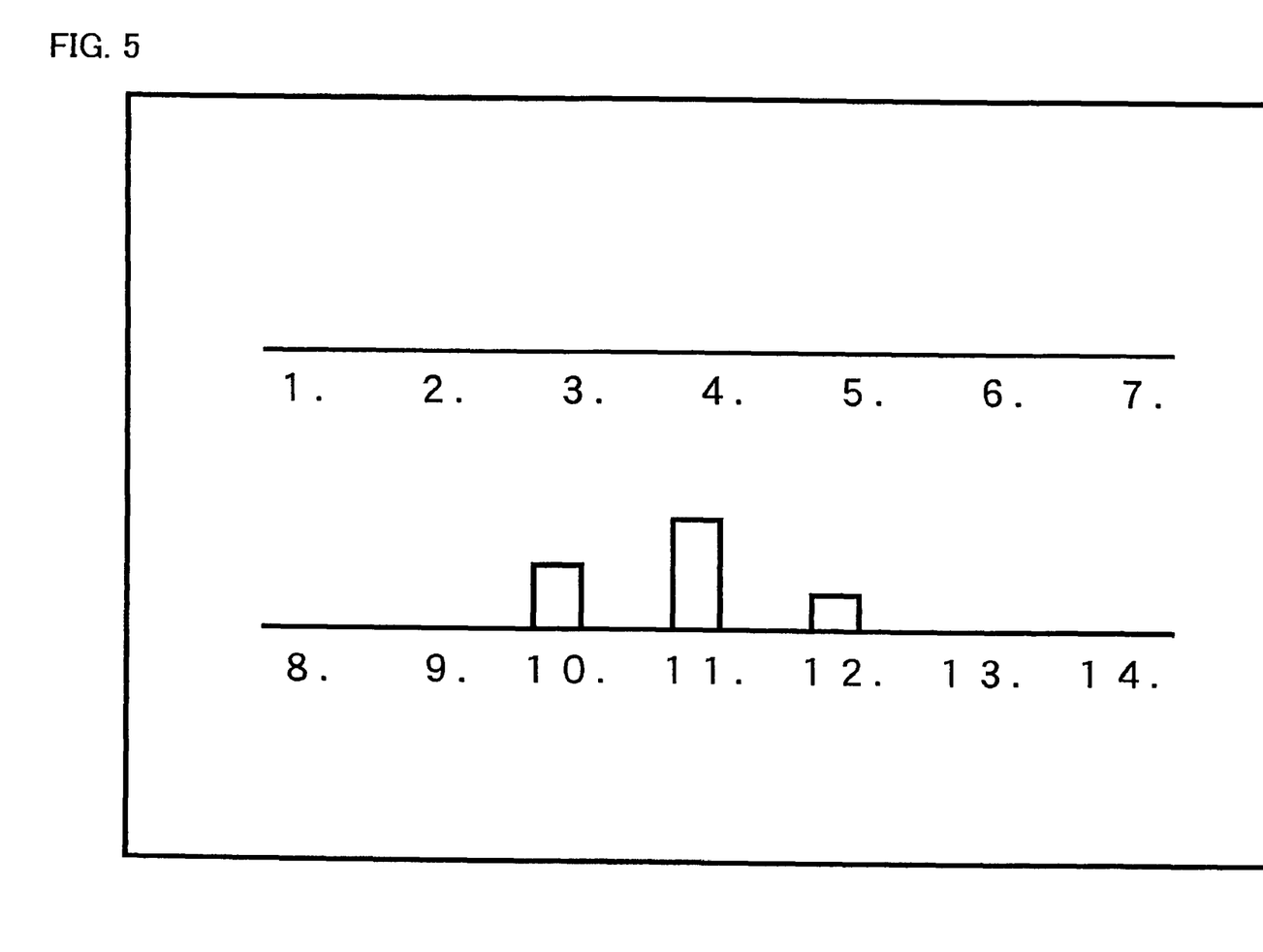
FIG. 5 is a diagram showing a manner of the jamming signal information displayed on the screen.

In cases where the jamming signal is detected in S5, it is determined that any signal cannot be received due to the jamming signal transmitted from the device such as the microwave oven. Then, the display apparatus B displays jamming signal information (S6). That is, when the jamming signal detecting means 34 detects the jamming signal, the jamming signal detecting means 34 sends, to the display control means 31, the signal indicating that the jamming signal detecting means 34 has detected the jamming signal. Then, the display control means 31 sends, to the image processing means 11, a signal for carrying out a display to indicate the "jamming signal information". FIGS. 4 and 5 show examples of how the "jamming signal information" is displayed, respectively. These examples will be fully described later.

On the other hand, in cases where no jamming signal is detected in S5, it is determined that a reason why any signal cannot be received is not due to the influence of the other device. Then, the display apparatus B displays information indicating that "it is not possible to receive any signal" (S7). Here, when the jamming signal detecting means 34 does not detect the jamming signal, the jamming signal detecting means 34 sends, to the display control means 31, a signal indicating that the jamming signal detecting means 34 has not detected the jamming signal. Then, the display control means 31 sends, to the image processing means 11, a signal for displaying that "it is not possible to receive any signal".

The following explains the jamming signal information.

The jamming signal information may be displayed so as to indicate "there is other device transmitting a jamming electric wave". However, when the jamming signal information is displayed in such a manner as described below, the jamming signal information becomes more useful and easily understandable.

The wireless communication can use a plurality of communication channels. For example, the IEEE 802.11b communication method can use 1 to 14 communication channels. Therefore, the display apparatus B can be arranged so as to (i) detect the jamming signal for each of the communication channels and (ii) display presence/absence of the jamming signal for each of the communication channels. Such an arrangement makes it possible to distinctively differentiate between (a) a communication channel that is being affected by the jamming signal and (b) a communication channel that is not being affected by the jamming signal. This makes it possible to easily switch from (i) the communication channel that is being affected by the jamming signal, to (ii) the communication channel that is not being affected by the jamming signal.

Further, the display apparatus B can be arranged so as to (i) compare levels of jamming signals with a plurality of predetermined levels, (ii) classify the levels of the jamming signals into a plurality of levels respectively corresponding to the predetermined levels, and (iii) display the levels of the jamming signals on respective scales of the plurality of levels. Thus, the levels of the jamming signals are classified into the plurality of levels, and then are displayed. This allows visual and sensory recognition of the level of each of the jamming signals. This allows the jamming signal information to be very easily understandable.

FIG. 4 shows an example of the jamming signal information. In this example, the levels of the jamming signals are displayed for the communication channels and on the scale of the plurality of levels corresponding to the predetermined levels, respectively. The jamming signal information thus exemplified and displayed herein is the "jamming signal information" shown in S6 of the flowchart shown in FIG. 3. In the example shown in FIG. 4, the level of each of the jamming signals is compared with three predetermined levels "−60 dB", "−80 dB", and "−100 dB" serving as the plurality of predetermined levels, and is displayed numerically on a four-level scale, i.e., in one of the following four three-digit numerical values: "850", "500", "300", and "000". Specifically, in cases where there is a jamming signal having a level exceeding "−60 dB", the three-digit numerical value of "850" is displayed. In cases where there is a jamming signal having a level falling within the range of "−60 dB" to "−80 dB", the three-digit numerical value of "500" is displayed. In cases where there is a jamming signal having a level falling within the range of "−80 dB" to "−100 dB", the three-digit numerical value of "300" is displayed. In cases where there is no jamming signal having a level exceeding −100 dB, the three-digit numerical value of "000" is displayed. The larger numerical value indicates the stronger influence of the jamming signal. FIG. 4 shows that each of the communication channels "10", "11", and "12" is being affected by the jamming signal. Therefore, the jamming signal information shown in FIG. 4 indicates that: the influence of the jamming signal can be avoided by using a communication channel having the three-digit numerical value of "000". In addition, when the numerical values are displayed in different formats (e.g., colors, color densities, character styles, and sizes) in accordance with the levels, the jamming signal information becomes very easily understandable.

Thus, the levels of the jamming signals are respectively displayed for the communication channels, so that it is possible to instantly and easily recognize the respective influences of the jamming signals for the communication channels. This makes it very easy to find a communication channel which is not being affected by the jamming signal, and to which the communication channel is switched. Further, the levels of the jamming signals are respectively displayed on the scale of the plurality of levels corresponding the predetermined levels, so that it is possible to instantly and easily recognize the extent of the respective influences of the jamming signals for the communication channels. Therefore, such an arrangement makes it possible to provide very easily understandable and simple jamming signal information made up of minimal information necessary for a user, a service person, or the like.

In cases where more detailed information concerning the jamming electric wave is necessary, the number of the predetermined levels may be increased. Further, the display content of the jamming signal information is not limited to the above example. For example, instead of displaying the respective strengths of the jamming signals, the display apparatus B may be arranged so as to (i) measure levels of jamming signals more than once within a predetermined period and (ii) display the number of jamming signals whose levels exceed predetermined levels.

FIG. 5 shows another example of the jamming signal information. The jamming signal thus exemplified and displayed herein is the "jamming signal information" shown in S6 of the flow chart shown in FIG. 3. FIG. 5 illustrates an example in which detection results identical to those shown in FIG. 4 are displayed graphically, instead of being displayed numerically, for respective the communication channels. The graphical representation of the jamming signal information facilitates sensory recognition. Also in FIG. 5, when the graphs are displayed in different formats (e.g., colors and color densities) in accordance with the four levels, respectively, the jamming signal information becomes much easier to understand.

Each of FIGS. 4 and 5 shows a mere example of displaying the jamming signal information, and the jamming signal information may be displayed in a different manner.

Further, for example, the display apparatus B becomes more useful when the display apparatus B is arranged such that: the plurality of predetermined levels with which the levels of the jamming signals are compared are able to be arbitrarily set and changed, for example, by controlling the setting of the determination thresholds with the use of the microcomputer 15.

Further, such jamming signal information serves as information based on which an operation such as a communication channel switching operation is carried out, and therefore is considered to be information necessary for a service person rather than a normal user. Therefore, the display apparatus B can also be arranged such that: the jamming signal information is not displayed in a normal setting, but is displayed when the service person changes the setting. For example, the display apparatus B can be arranged such that: when any other recognition information signal is not detected in the normal setting in S3 of the flowchart shown in FIG. 3, the process always proceeds to S7 so that the information indicating that "it is not possible to receive any signal" is displayed.

Note that the display apparatus B can also be arranged so as to automatically switch to, in accordance with the jamming signal information, a communication channel that is not being affected by the jamming signal.

Figure 3:
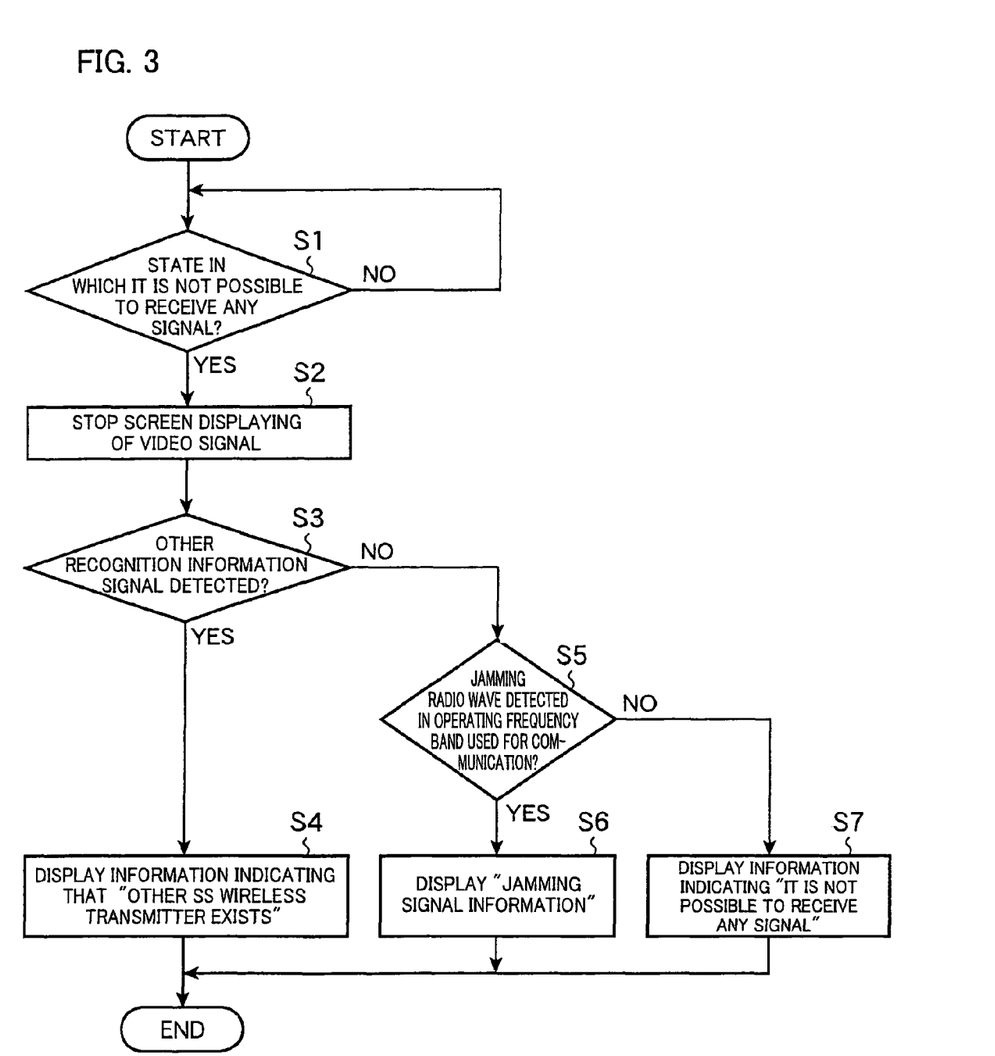
FIG. 3 is a flowchart concerning display control carried out in cases where a signal cannot be received in the wireless transmitting and receiving system according to the embodiment of the present invention.

In the flowchart shown in FIG. 3, when the video signal becomes unable to be received, the display apparatus B stops displaying the image that is based on the video signal, and displays a reason why the video signal cannot be received. As such, TV viewing users are given the reason why the video signal cannot be received. In cases where the users are thus notified of the reason why the video signal cannot be received, most of the users do not know a way of dealing with the situation. This may cause confusion for each of the users.

For the purpose of minimizing the risk of causing confusion for the user, the following process is carried out. See a flow chart shown in FIG. 6. In this process, the user is only notified that the video signal has become unable to be received, and the reason why the video signal cannot be received is notified to the service person.

Figure 6:
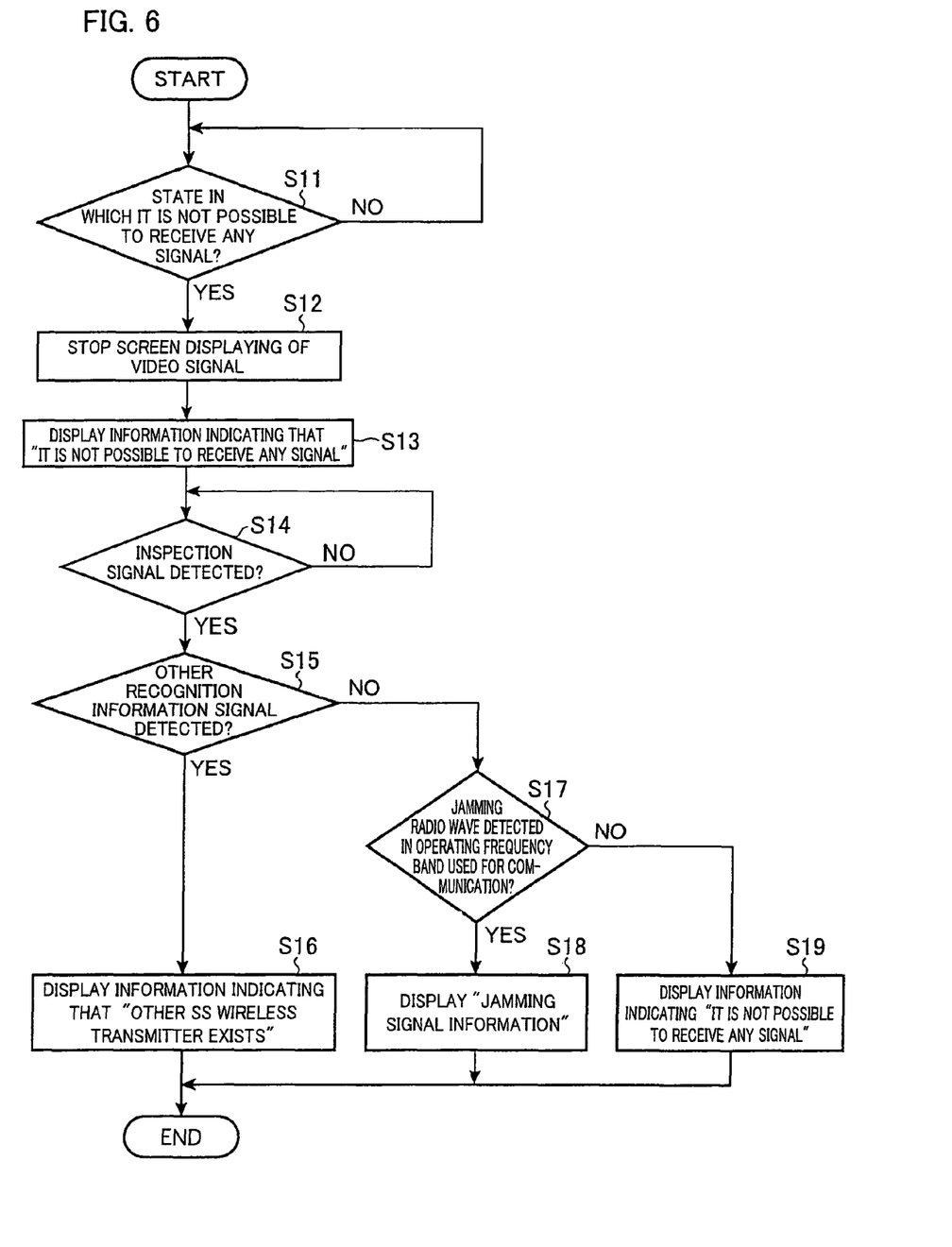
FIG. 6 is a flow chart concerning another display control process carried out in cases where a video signal cannot be received in the wireless transmitting and receiving system according to the embodiment of the present invention.

That is, in cases where the video signal transmitted from the wireless transmitting apparatus A cannot be normally received by the display apparatus B (S11), the display apparatus B stops displaying the image that is based on the received video signal (S12).

Then, the display apparatus B displays the information indicating that "the video signal cannot be received" (S13). At this point, the user calls the service person.

Then, detection of an inspection signal is carried out by the called service person (S14). In this case, the service person operates an inspection signal key provided in the remote controller or the like, so as to send the inspection signal to the microcomputer 15. It is preferable that the inspection signal key be unnoticed by the user. For example, the inspection signal key may be a hidden key provided in the remote controller. Alternatively, the inspection signal may be inputted by using operation means other than the remote controller.

In response to the reception of the inspection signal, the microcomputer 15 detects whether or not the microcomputer 15 has received a recognition information signal other than the recognition information signal set therein (S15). In cases where the other recognition information signal is detected, it is determined that any signal cannot be received due to a jamming electric wave transmitted from a communication device transmitting the other recognition information signal. Then, the display apparatus B displays "other SS wireless transmitter exists" (S16).

On the other hand, in cases where the microcomputer 15 does not detect any other recognition information signal, the microcomputer 15 detects whether or not a jamming signal other than the received video signal exists in the operating frequency band used for the wireless communication (S17). In cases where such a jamming signal is detected, it is determined that any signal cannot be detected due to the jamming signal transmitted from other device such as a microwave oven. Then, the display apparatus B displays the jamming signal information (S18).

On the other hand, in cases where the jamming signal is not detected in S17, it is determined that a reason why any signal cannot be received is not due to influence of the other device. Then, the display apparatus B displays that the display apparatus B is in a general signal unreceivable state. (S19).

As described above, the information to be shown to the user is separated from the information to be shown to the service person. This allows reduction of the risk of causing confusion for the user.

In the foregoing process, the display in each of S16, S18, and S19 is carried out by the display means 12 of the display apparatus B. Also in the display control shown in the flowchart of FIG. 3, the display is carried out by the display means 12 of the display apparatus B.

As described above, the present embodiment uses the display means 12 to display the information to show at the time when the video signal has become unable to be received. However, the information, to show at the time when the video signal has become unable to be received, may be displayed by the display means different from the display means 12 for displaying an image.

That is, the display means 12 is not the only means for displaying (i) the jamming signal information and/or (ii) the information which informs the presence of a different SS wireless communication device. Alternative means is, for example, means for informing the user of (i) the jamming signal information or (ii) the information indicative of the presence of a different SS wireless communication device by carrying out an output controlling at an output terminal which ordinarily outputs received image information to an externally connected display device, such that those information are outputted to and displayed on a screen of other display device.

Such an arrangement will be specifically described below with reference to a block diagram shown in FIG. 7.

Figure 7:
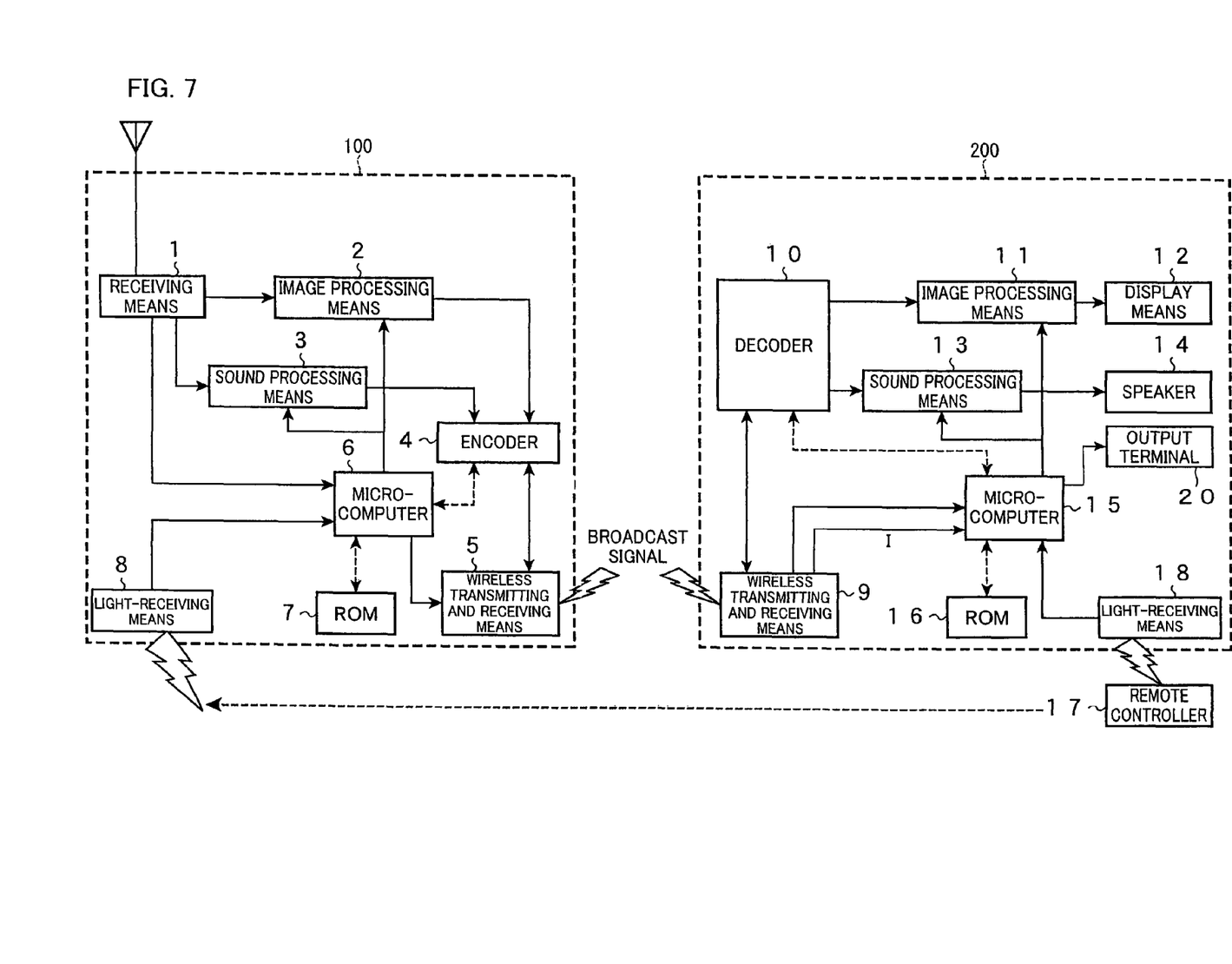
FIG. 7 is a block diagram showing a wireless transmitting and receiving system according to another embodiment of the present invention.

FIG. 7 is the block diagram showing a wireless transmitting and receiving system including a display unit 200 which has an image output terminal 20 separately from the display means 12. An image transmission unit 100 is arranged in the same manner as the wireless transmitting apparatus A of the wireless transmitting and receiving section shown in FIG. 2, and therefore detail description will be omitted. Further, the display unit 200 is arranged in the same manner as the display apparatus B of the wireless transmitting and receiving system of FIG. 2, except that the display unit 200 is provided with the output terminal 20, and therefore detail description will be omitted.

The wireless transmitting and receiving system shown in FIG. 7 is arranged as follows. Specifically, in cases where either the wireless transmitting and receiving means 5 of the image transmission unit 100 or the wireless transmitting and receiving means 9 of the display unit 200 detects either the presence of a different SS wireless device or a jamming radio wave, the microcomputer 15 of the display unit 200 (i) reads out, from the ROM 16, either the jamming signal information or the information informing the presence of a different SS wireless communication device, and (ii) carries out such a control at the image output terminal 20 of the display unit 200 that an information display process is carried out with respect to the information thus read out. In the information display process, the above information is superimposed onto another image signal (e.g., a single uniform pattern signal such as a black screen which is outputted instead of a received video signal that is not accurately displayed).

That is, the display control means 31 (see FIG. 1) provided in the microcomputer 15 of the display unit 200 is arranged so as to serve as jamming signal information outputting means for outputting the control signal to the output terminal 20 instead of the image processing means 11 for the purpose of causing the display means different from the display means 12 to display the poor signal reception information.

With this arrangement, it is possible to prevent an unviewable image from being provided to the user. Moreover, with this arrangement, by switching between the display means, it is possible to adequately inform the user and a service person of whether it is not possible to receive any signal by either the presence of the jamming electric wave or the presence of the different SS wireless device.

As described above, in cases where the video signal cannot be normally received, the display apparatus of the foregoing arrangement can display information which makes it possible to recognize whether or not the poor reception is caused by a jamming electric wave having a frequency falling within the operating frequency band used for the wireless communication. This makes it possible to easily find out how to deal with the poor reception.

The present invention is not limited to the description of the embodiments above, but may be altered by a skilled person within the scope of the claims. An embodiment based on a proper combination of technical means disclosed in different embodiments is encompassed in the technical scope of the present invention.

Operating means such as a CPU executes a program stored in storage means such as a ROM (read only memory) and a RAM (random access memory) so as to control input means (e.g., a keyboard), output means (e.g., a display), or communication means (e.g., an interface circuit). In this way, the members and processes of the display apparatus of the foregoing embodiment are achieved and executed. Therefore, the foregoing various functions and processes of the display apparatus of the present embodiment can be achieved by simply causing a computer having these means to read and execute the program stored in a storage medium. Further, by storing the program in a removable storage medium, the various functions and processes can be achieved on any computer.

Such a computer program storage medium may be a memory (not shown), such as a ROM, so that the process is executable on a microcomputer. Alternatively, a program medium may be used which can be read by inserting the storage medium in an external storage device (program reader device; not shown).

In addition, in either of the cases, it is preferable if the contained program is accessible to a microprocessor which will execute the program. Further, it is preferable if the program is read, and the program is then downloaded to a program storage area of a microcomputer where the program is executed. Assume that the program for download is stored in a main body device in advance.

In addition, the program medium is a storage medium arranged so that it can be separated from the main body. Examples of such a program medium include a tape, such as a magnetic tape and a cassette tape; a magnetic disk, such as a flexible disk and a hard disk; a disc, such as a CD/MO/MD/DVD; a card, such as an IC card (inclusive of a memory card); and a semiconductor memory, such as a mask ROM, an EPROM (erasable programmable read only memory), an EEPROM (electrically erasable programmable read only memory), or a flash ROM. All these storage media hold a program in a fixed manner.

Alternatively, if a system can be constructed which can connects to the Internet or other communications network, it is preferable if the program medium is a storage medium carrying the program in a flowing manner as in the downloading of a program over the communications network.

Further, when the program is downloaded over a communications network in this manner, it is preferable if the program for download is stored in a main body device in advance or installed from another storage medium.

INDUSTRIAL APPLICABILITY

The present invention makes it possible to determine why it is not possible to receive a signal in a wireless transmitting and receiving system, and therefore can be applied in general to a device capable of transmitting and receiving a radio signal.

The invention claimed is:

1. A display apparatus for receiving at least a video signal by wireless communication,
the display apparatus, comprising:
a wireless receiving unit receiving the video signal that is wirelessly transmitted;
a display unit displaying an image in accordance with at least the video signal;
a jamming signal detecting unit detecting, in an operating frequency band used for the wireless communication, a jamming signal; and
a display controller causing the display unit to display, in response to the detection of the jamming signal, jamming signal information indicating presence of the jamming signal,
wherein the jamming signal is a received signal different from the received video signal, the jamming signal being generated from a device different from the device that has transmitted said video signal, and the jamming signal is a signal from which no recognition information signal is detected, and
wherein the recognition information signal is a signal that is used for enabling connection to a specific destination.

2. The display apparatus as set forth in claim 1, wherein:
the jamming signal detecting unit detects the jamming signal for each communication channel available in the operating frequency band; and
the display controller causes the display unit to display, as the jamming signal information, information indicating the presence of the jamming signal for said each communication channel.

3. The display apparatus as set forth in claim 1, wherein:
the jamming signal detecting unit compares a level of the jamming signal with a plurality of predetermined levels so as to detect a jamming signal level; and
the display controller causes the display unit to display the jamming signal information in accordance with the jamming signal level.

4. The display apparatus as set forth in claim 3, wherein:
the display controller causes the display unit to display the jamming signal information numerically in accordance with the jamming signal level.

5. The display apparatus as set forth in claim 3, wherein:
the display controller causes the display unit to display the jamming signal information graphically in accordance with the jamming signal level.

6. The display apparatus as set forth in claim 3, wherein:
the display controller changes a display format, such as a color, of the jamming signal information in accordance with the jamming signal level, and causes the display unit to display the jamming signal information in the display format.

7. The display apparatus as set forth in claim 3, wherein: the plurality of predetermined levels are able to be arbitrarily set and changed.

8. A wireless transmitting and receiving system for transmitting and receiving at least a video signal by wireless communication,
the wireless transmitting and receiving system, comprising:
a wireless transmitting apparatus for wirelessly transmitting the video signal and a recognition information signal; and
a display apparatus, which includes:
a wireless receiving unit receiving the video signal and the recognition information signal;
a display unit displaying an image in accordance with at least the video signal;
a recognition information detecting unit detecting the recognition information signal;
a jamming signal detecting unit detecting, in an operating frequency band used for the wireless communication, a jamming signal; and
a display controller, when the video signal is not normally received, causing the display unit to display abnormality information indicating an abnormal state,
wherein, when the jamming signal detecting unit detects the jamming signal, the display controller causing the display unit to display, as the abnormality information, jamming signal information indicating presence of the jamming signal,
wherein the jamming signal is a received signal different from the received video signal, the jamming signal being generated from a device different from the device that has transmitted said video signal, and the jamming signal is a signal from which no recognition information signal is detected, and
wherein the recognition information signal is a signal that is used for enabling connection to a specific destination.

9. The wireless transmitting and receiving system as set forth in claim 8, wherein:
the jamming signal detecting unit detects the jamming signal for each communication channel available in the operating frequency band; and
the display controller causes the display unit to display, as the jamming signal information, information indicating the presence of the jamming signal for said each channel.

10. The wireless transmitting and receiving system as set forth in claim 8, wherein:
the jamming signal detecting unit compares a level of the jamming signal with a plurality of predetermined levels so as to detect a jamming signal level; and
the display controller causes the display unit to display the jamming signal information in accordance with the jamming signal level.

11. The wireless transmitting and receiving system as set forth in claim 10, wherein:
the display controller causes the display unit to display the jamming signal information numerically in accordance with the jamming signal level.

12. The wireless transmitting and receiving system as set forth in claim 10, wherein:
the display controller causes the display unit to display the jamming signal information graphically in accordance with the jamming signal level.

13. The wireless transmitting and receiving system as set forth in claim 10, wherein:
the display controller changes a display format, such as a color, of the jamming signal information in accordance with the jamming signal level, and causes the display unit to display the jamming signal information in the display format.

14. The wireless transmitting and receiving system as set forth in claim 10, wherein:
the plurality of predetermined levels are able to be arbitrarily set and changed.

15. The wireless transmitting and receiving system as set forth in claim 8, wherein:
when the recognition information detecting unit detects another recognition information signal different from the recognition information signal transmitted from the wireless transmitting apparatus, the display controller causes the display unit to display, as the abnormality information, information indicating that there is another wireless transmitting apparatus transmitting said another recognition information signal.

16. The wireless transmitting and receiving system as set forth in claim 8, wherein:
when the recognition information detecting unit does not detect said another recognition information signal different from the recognition information signal transmitted from the wireless transmitting apparatus, the jamming signal detecting unit carries out detection of the jamming signal.

17. The wireless transmitting and receiving system as set forth in claim 8, wherein:
when the jamming signal detecting unit does not detect the jamming signal, the display controller causes the display unit to display, as the abnormality information, information indicating that it is not possible to receive any signal.

18. A display apparatus for receiving at least a video signal by wireless communication,
the display apparatus, comprising:
a wireless receiving unit receiving the video signal that is wirelessly transmitted;
a jamming signal detecting unit detecting, in an operating frequency band used for the wireless communication, a jamming signal; and
a jamming signal information outputting unit, in response to the detection of the jamming signal, outputting jamming signal information indicating presence of the jamming signal,
wherein the jamming signal is a received signal different from the received video signal, the jamming signal being generated from a device different from the device that has transmitted said video signal, and the jamming signal is a signal from which no recognition information signal is detected, and
wherein the recognition information signal is a signal that is used for enabling connection to a specific destination.

19. The display apparatus as set forth in claim 18, wherein:
the jamming signal information outputting unit sends the jamming signal information to superimposition display unit for displaying the jamming signal information superimposed onto the image displayed by the display unit.

20. A display apparatus for (i) receiving at least a video signal by wireless communication and (ii) displaying an image in accordance with the video signal, the display apparatus, comprising:
a jamming signal detecting unit for detecting, in an operating frequency band used for the wireless communication, a jamming signal,
wherein the jamming signal is a received signal different from the received video signal, the jamming signal being generated from a device different from the device that has transmitted said video signal, and the jamming signal is a signal from which no recognition information signal is detected, and
wherein the recognition information signal is a signal that is used for enabling connection to a specific destination.

21. A display method for (i) receiving at least a video signal by wireless communication and (ii) displaying an image,
the display method, comprising:
a first step of determining whether or not the video signal that is wirelessly transmitted is unable to be received;
a second step of, when it is determined in the first step that the video signal is unable to be received, determining whether or not a jamming signal is detected in an operating frequency band used for the wireless communication; and
a third step of carrying out a display in accordance with a result of the determination made in the second step, so as to inform that it is not possible to receive any signal,
wherein the jamming signal is a received signal different from the received video signal, the jamming signal being generated from a device different from the device that has transmitted said video signal, and the jamming signal is a signal from which no recognition information signal is detected, and
wherein the recognition information signal is a signal that is used for enabling connection to a specific destination.

22. A non-transitory computer-readable medium having instructions stored thereon, said instructions are read and executed by a processor, wherein the processor (i) receives at least a video signal by wireless communication and (ii) displays an image and the processor is configured to perform the steps of:
a step of determining whether or not the video signal that is wirelessly transmitted is unable to be received;
a step of, when it is determined in the first step that the video signal is unable to be normally received, determining whether or not a jamming signal is detected in an operating frequency band used for the wireless communication; and
a step of carrying out a display in accordance with a result of the determination made in the second step, so as to inform that it is not possible to receive any signal,
wherein the jamming signal is a received signal different from the received video signal, the jamming signal being generated from a device different from the device that has transmitted said video signal, and the jamming signal is a signal from which no recognition information signal is detected, and
wherein the recognition information signal is a signal that is used for enabling connection to a specific destination.

* * * * *